United States Patent
Gizara (10) Patent No.: US 7,961,023 B2
(45) Date of Patent: *Jun. 14, 2011

(54) PULSE WIDTH MODULATION SEQUENCE MAINTAINING MAXIMALLY FLAT VOLTAGE DURING CURRENT TRANSIENTS

(75) Inventor: Andrew Roman Gizara, Lake Forest, CA (US)

(73) Assignee: IPower Holdings LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,724

(22) Filed: May 17, 2010

(65) Prior Publication Data

US 2010/0271097 A1 Oct. 28, 2010

Related U.S. Application Data

(63) Continuation of application No. 11/555,128, filed on Oct. 31, 2006, now Pat. No. 7,719,336.

(51) Int. Cl.
*H03K 3/017* (2006.01)

(52) U.S. Cl. ........... 327/175; 327/31; 323/223; 323/273

(58) Field of Classification Search ................. None
See application file for complete search history.

(56) References Cited

U.S. PATENT DOCUMENTS

| | | |
|---|---|---|
| 4,084,103 A | 4/1978 | Burns, III et al. |
| 4,118,696 A | 10/1978 | Warther |
| 4,916,635 A | 4/1990 | Singer |
| 5,132,606 A | 7/1992 | Herbert |

(Continued)

FOREIGN PATENT DOCUMENTS

EP 0 093 902 A1 11/1983

(Continued)

OTHER PUBLICATIONS

Gizara, U.S. Appl. No. 11/369,161, filed Mar. 6, 2006, entitled "System and Method for Integrating a Digital Core With a Switch Mode Power Supply.".

(Continued)

*Primary Examiner* — An T Luu
(74) *Attorney, Agent, or Firm* — Sterne, Kessler, Goldstein & Fox P.L.L.C.

(57) ABSTRACT

A digital circuit implementing pulse width modulation controls power delivered in what one can model as a second order or higher order system. An exemplary control plant could embody a step-down switch mode power supply providing a precise sequence of voltages or currents to any of a variety of loads such as the core voltage of a semiconductor unique compared to its input/output ring voltage. One of several algorithms produce a specific predetermined sequence of pulses of varying width such that the voltage maintains maximally flat characteristics while the current delivered to the load from the system plant varies within a range bounded only by inductive element continuous conduction at the low power extreme and non-saturation of the inductor core at the high power extreme. The specific pulse width modulation sequence controls a plant such that the voltage maintains maximally flat characteristics in one embodiment without a feed-forward or feedback loop physically embodied in the control system thereby reducing the parts cost or control semiconductor production yield cost while enhancing noise immunity and long term reliability of the control system. Several specific algorithms maintain maximally flat voltage despite extreme load variations therewith control plant element parameters otherwise exacerbating excessive voltage fluctuation during the given current transients.

30 Claims, 4 Drawing Sheets

U.S. PATENT DOCUMENTS

| | | | |
|---|---|---|---|
| 5,570,276 | A | 10/1996 | Cuk et al. |
| 5,932,938 | A | 8/1999 | Shimamori |
| 6,057,675 | A | 5/2000 | Tateishi |
| 6,229,292 | B1 | 5/2001 | Redl et al. |
| 6,292,122 | B1 | 9/2001 | Younis et al. |
| 6,396,725 | B1 | 5/2002 | Jacobs et al. |
| 6,683,767 | B2 | 1/2004 | Ito et al. |
| 6,781,353 | B2 | 8/2004 | Rozsypal |
| 6,930,473 | B2 * | 8/2005 | Elbanhawy ............ 323/282 |
| 6,940,189 | B2 | 9/2005 | Gizara |
| 6,965,221 | B2 | 11/2005 | Lipcsei et al. |
| 7,007,176 | B2 | 2/2006 | Goodfellow et al. |
| 7,057,907 | B2 | 6/2006 | Oh |
| 7,098,640 | B2 | 8/2006 | Brown |
| 7,106,039 | B1 | 9/2006 | Scott et al. |
| 7,107,468 | B2 | 9/2006 | Pullen et al. |
| 7,152,083 | B2 | 12/2006 | Singh |
| 7,248,027 | B2 | 7/2007 | Ribeiro et al. |
| 2005/0184716 | A1 | 8/2005 | Brown |
| 2008/0088385 | A1 | 4/2008 | Gizara |
| 2008/0100362 | A1 | 5/2008 | Gizara |

FOREIGN PATENT DOCUMENTS

| | | |
|---|---|---|
| EP | 1 783 568 | 5/2007 |
| WO | WO 95/34121 | 12/1995 |
| WO | WO 2006/013776 | 2/2006 |
| WO | WO 2008/048865 A3 | 4/2008 |
| WO | WO 2008/060850 A2 | 5/2008 |

OTHER PUBLICATIONS

International Search Report for Appl. No. PCT/US07/81148, issued Apr. 22, 2008, 5 pages.

Yanagawa et al., "PID Auto-tuning Controller Using a Single Neuron for DC Servomotor," Industrial Electronics, 1992, Proceedings of the IEEE International Sumposium on Xian, China, May 25-29, 1992, pp. 277-280.

Luo et al., "Mathematical Modeling of Power DC/DC Converters," Power System Technology, 2004. Powercon 2004. 2004 International Conferenc e on Singapore, Nov. 21-24, 2004, Piscataway, NJ, USA, IEEE, US, Nov. 21, 2004, pp. 17-22 vol. 1.

International Search Report for Appl. No. PCT/US07/82956, issued May 8, 2008, 3 page.

Office Communication (Notice Requesting Submission of Opinion) issued in Korean Patent Application No. 10-2009-7011181, Korean Intellectual Patent Office, mailed on Dec. 20, 2010 (Korean language).

* cited by examiner

FIG. 1

$$x_m(t) = V_{sw} \sum_{n=0}^{N} (u(t-t_0) - u(t-t_0 - n_1 T_{sw}))[u(t-t_0 - nT_{sw}) - u(t-t_0 - nT_{sw} - T_{Set(p+1)})] +$$
$$u(t-t_0 - n_1 T_{sw})[u(t-t_0 - nT_{sw}) - u(t-t_0 - nT_{sw} - (T_{Set(p)} + \Delta T_{Set(m)})(1-(1+\omega_0(n+n_2)T_{sw})e^{-\omega_0(n+n_2)T_{sw}}))]$$

200

$$x_m(t) = V_{sw} \sum_{n=n_0}^{N} (u(t-t_0) - u(t-t_0 - n_1 T_{sw}))[u(t-t_0 - nT_{sw}) - u(t-t_0 - nT_{sw} - T_{Set(p+1)}(A_{Ierr(m)}))] +$$
$$u(t-t_0 - n_1 T_{sw})[u(t-t_0 - nT_{sw}) - u(t-t_0 - nT_{sw} - (T_{Set(p)} + \Delta T_{Set(m)})(1-(1+\omega_0(n+n_2)T_{sw})e^{-\omega_0(n+n_2)T_{sw}}))]$$

201

$$A_{Ierr(m)}\big|_{0 > A_{Verr(m)} > -5\%} \cong (1 - (A_{Verr(m)}))(L_m)$$

202

$$A_{Ierr(m)}\big|_{0 < A_{Verr(m)} < 5\%} \cong (1 - (A_{Verr(m)}))/(L_m)$$

203

$$A_{Verr(m)} \equiv \frac{V_m(t)\big|_{\max|V_m(t) - V_{Set(m)}|} - V_{Set(m)}}{V_{Set(m)}}$$

204

$$L_m \cong \frac{|I_{p+1} - I_p|}{\min(I_p, I_{p+1})}$$

205

$$A_{Ierr(m)}\big|_{|A_{Verr(m)}| \geq 5\%} \cong (1 - (A_{Verr(m)})(L_m))$$

PULSE WIDTH MODULATION SEQUENCE MAINTAINING MAXIMALLY FLAT VOLTAGE DURING CURRENT TRANSIENTS

CROSS REFERENCE TO RELATED APPLICATIONS

This application is a continuation of U.S. application Ser. No. 11/555,128, filed Oct. 31, 2006, and entitled "Pulse Width Modulation Sequence Maintaining Maximally Flat Voltage During Current Transients" (now U.S. Pat. No. 7,719,336 issued May 18, 2010), which is hereby incorporated by reference in its entirety.

BACKGROUND OF THE INVENTION

1. Field of the Invention

The present invention is generally in the field of control systems. More specifically, the present invention is in the field of use of pulse width modulation in a control system. This specification herein exemplifies the present invention in a digitally controlled power supply embodying voltage regulation in the presence of a broad range of current transients.

2. Background Art

Recently, advances in semiconductor integrated circuit fabrication processes have given rise to integrated circuits requiring separate power supplies for various parts including a voltage for the input/output pad ring, and a second, unique power supply voltage for the digital core. While this advancement brings the advantage of reduced core power consumption, there arises the problem of regulation of these additional voltages. With the advent of system-on-chip technologies, designers of these devices have only begun to address this requirement for regulating multiple power supply domains on-chip. U.S. Pat. No. 6,940,189 addresses an implementation of a digital open loop pulse width modulation control system as an optimal means to reduce costs and enhance power efficiency of the total system-on-chip solution. The aforementioned reference patent does not address the problem of overshoot in the step response of the switch mode power supply powering the core voltage domain. U.S. patent application Ser. No. 11/549,586 introduces a pulse width modulation sequence generating a near critical damped step response that addresses the problem of overshoot during transitions in voltage along with suggesting use for the same algorithm for current transitions. However, limitations in the range of current transients and range of plant component parameters exist beyond which the algorithm within the reference patent application Ser. No. 11/549,586 maintains a less than maximally flat voltage.

Therefore, there exists a need for a novel pulse width modulation algorithm serving a broadened range of plant component values and greater magnitudes of change in output current and thus overcome the problem of voltage instability in response to current transients thereby providing a maximally flat voltage to power loads typically requiring precise regulation such as semiconductor cores.

SUMMARY OF THE INVENTION

The present invention is directed to a novel but readily comprehensible algorithm implemented with tools commonly in use by a control engineer of ordinary skill in the art. The present invention depicts a simple algorithm to create a specific pulse width modulation sequence that maintains a maximally flat voltage in a second order or higher order linear or non-linear system that otherwise would exhibit substantial voltage instability in response to current transients. The present invention exemplifies the use of the algorithm in integrating a semiconductor die of plural power supply voltage domains with an open or closed loop switch mode DC-to-DC converter to obtain optimal power savings, and minimal heat dissipation and component cost.

In addition, the present invention is not limited to application to the exemplary system. The present invention may be applied to control of any second or higher order system mathematically analogous to pulsed control and requiring a fixed output set-point in response to a transient load. Any electrical, mechanical or electromechanical system under the mathematical analogue of pulsed open loop control may especially benefit from the present invention whereby without the present invention, open loop control could result in unacceptable output instability thus rendering such a topology undesirable and the cost benefits and ease of implementation of such open loop topology unrealizable. The present invention places only the design requirements of use of control plant component values of +/−10% tolerance and reasonably accurate estimates of the load of the system, with tolerance of +/−20% depending upon the load regulation specification and plant parameters of the control system.

DETAILED DESCRIPTION OF THE INVENTION

The present invention pertains to a control system and algorithm for maintaining a maximally flat voltage during current transients using pulse width modulation techniques in an inherently under damped system. The following description contains specific information pertaining to various embodiments and implementations of the invention. One skilled in the art will recognize that one may practice the present invention in a manner different from that specifically depicted in the present specification. Furthermore, the present specification has omitted some of the specific details of the present invention in order to not obscure the invention. A person of ordinary skill in the art would have knowledge of the specific details not described in the present specification. Obviously, one may omit or only partially implement some features of the present invention and remain well within the scope and spirit of the present invention.

The following drawings and their accompanying detailed description apply as merely exemplary and not restrictive embodiments of the invention. To maintain brevity, the present specification has not specifically described other embodiments of the invention that use the principles of the present invention and has not specifically illustrated other embodiments in the present drawings.

Figure 1:
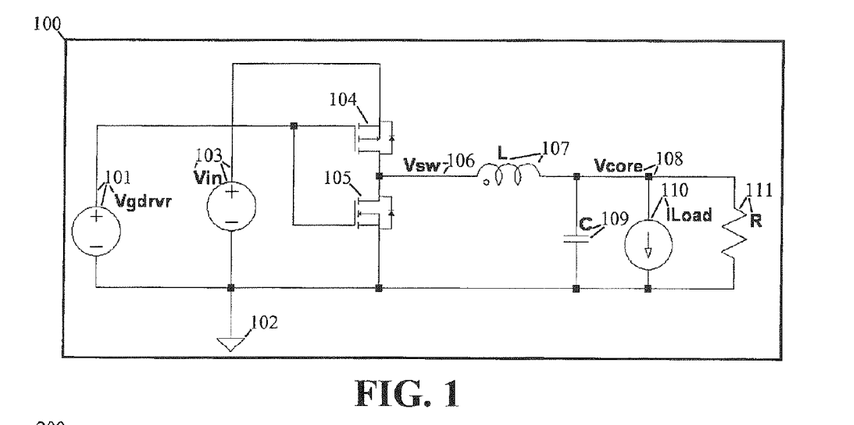
FIG. 1 illustrates a schematic view of an exemplary structure in accordance with one embodiment of the present invention.

FIG. 1 illustrates a schematic of an exemplary practical embodiment of the present invention. Block 100 represents the control plant implemented with physical models of plant components in the exemplary embodiment of the present invention. The exemplary embodiment within block 100 consists of the typical step-down switch mode power supply components that constitute a canonical parallel resonant LRC circuit well understood by one of ordinary skill in the art. In block 100, the output from a model of a pulse width modulation controller labeled Vgdrvr 101 drives the gates of the physical transistors 104, 105. The node entitled VSW 106 connects the inductor labeled L 107 and the output capacitor labeled C 109 that form the energy storage and filtering elements that transform the switched Vin 103 to a DC output labeled Vcore 108. Vcore 108 powers the load, in this exemplary embodiment a semiconductor core that draws one of various amounts of current for each of its discrete predetermined power states, modeled in block 100 as a resistor labeled R 111 along with a piece-wise linear time domain model load labeled ILoad 110. The schematic block 100 references all components directly or indirectly through directly coupled components, to ground 102. The reference patent application Ser. No. 11/549,586 addresses two cases, under damped and critical damped response for voltage and current transitions from one discrete predetermined power state to the next in such a model 100 and analogous systems. Furthermore, the present invention extends the specification of the pulse width modulation sequence to direct the behavior of output voltage Vcore 108 remaining as unchanged as possible in the presence of current change of any of a wide range of magnitudes from one discrete predetermined power state to the next.

Figure 2:
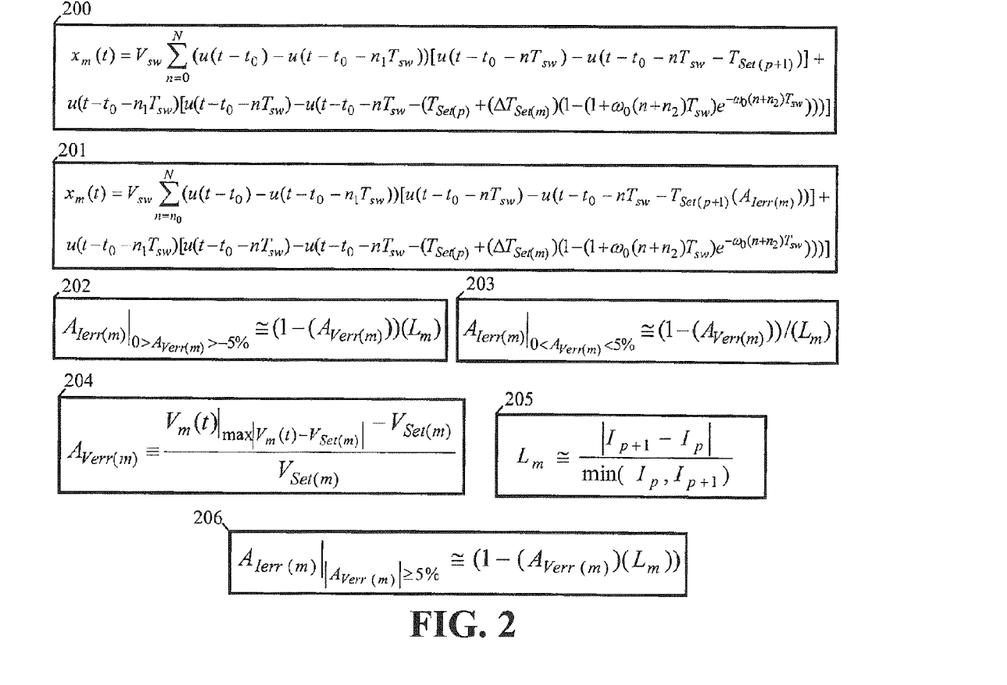
FIG. 2 illustrates general equations describing a pulse sequence that results in a maximally flat voltage during current transients in any direction in a practical system.

FIG. 2 reiterates equation 200 from the reference patent application Ser. No. 11/549,586, a general form of the output signal from the gate driver and pulse width modulation controller Vgdrvr 101. In equation 200, the variable $x_m(t)$ identifies the time domain function describing the pulses output from the pulse width modulation controller Vgdrvr 101 which results in a critical damped step response for the circuit in the reference patent application Ser. No. 11/549,586. Herein this specification of the present invention, equation 201 of FIG. 2 extends equation 200 so that by means of equation 201, $x_m(t)$ may now provide enhanced response in the form of maximally flat output voltage Vcore 108 during current transients. Both the reference specification and the specification of the present invention have a majority of variables and coefficients commonly defined with exceptions noted in this and subsequent paragraphs.

The subscript m in equations 200 through 206 implies a unique response $y_{m(t)}$ associated with a unique input $x_m(t)$ for each transition in system state that m indexes, where p indexes the discrete power states. Thus, these equations describe a means to maintain a maximally flat output voltage Vcore 108 for any arbitrary transition m proceeding from any discrete power state p to any next power state p+1.

In equations 200 and 201, $V_{SW}$ 106 replaces Vin 103 since the reference application Ser. No. 11/549,586 introduces a coefficient compensating for the dynamic losses through the physical switching element, $A_{DE(p)}$, and thus allows equations 200 and 201 to retain the mathematical precision given in an equation otherwise comprising Vin 103 for a thorough system analysis.

The discrete variable n, the index of summation in equations 200 and 201, represents a discrete index of time that counts switching periods $T_{SW}$, the inverse of the switching frequency. The value of n equal to zero coincides with the initiation of the power state transition occurring at any time $t_0$, not necessarily presuming the transition occurs at t=0. The reference U.S. Pat. No. 6,940,189 asserts the designer of such a system fully characterizes the load, a semiconductor core operating in all margins of process, temperature, and input currents and voltages for the exemplary system under development. Thus, equation 201 introduces a discrete variable $n_0$, whereby the pulse width modulation controller Vgdrvr 101 may predict a predetermined transition in power state mathematically defined by a negative value for no and thereby provide an appropriate sequence of pulses to guarantee a maximally flat voltage across a current transient. The reference patent application Ser. No. 11/549,586 introduced discrete variable $n_1$ denoting an integer number of switching periods $T_{SW}$ in which the duty cycle initially assumes its final value in order to obtain the desired voltage gain set-point. Within the reference patent application Ser. No. 11/549,586, the inventor asserted this initial time period of duration equal to $n_1$ times $T_{SW}$ at the set-point pulse width provides a precise amount of power to initiate a near critical damped step response. This specification for the present invention now states the initial period of duration equal to $n_1$ times $T_{SW}$ at the set-point pulse width times $A_{Ierr(m)}$, a coefficient to compensate for extreme current transients affecting the otherwise constant voltage, as applied in equation 201 now provides a precise amount of power to ensure a maximally flat voltage. This specification will further describe $A_{Ierr(m)}$ subsequently. The discrete variable $n_2$ in equations 200 and 201 signifies an offset in time in the application of the exponential scaling function from the time at which one applies the scaling to the duty cycle. Therefore the discrete variables $n_1$ and $n_2$ in equations 200 and 201 carry out the resulting purpose of coarse and fine tuning in the time domain, respectively, to bring the system current transient response, once tuned, closer towards a maximally flat voltage. One may view the value N, the practical upper limit of summation in equations 200 and 201, as the number of switching periods $T_{SW}$ coinciding to when the width of the pulses have reached the desired set-point pulse width to within the accuracy of the pulse width modulation controller Vgdrvr 101. For example, the exponential scaling function: $(1-(1+\bar{\omega}_0(n+n_2)T_{SW})e^{-\bar{\omega}_0(n+n_2)T_{SW}})$, wherein e signifies the constant equal to the base of natural logarithms, equals 99% when $n+n_2=N$, at which point in time $(n+n_2)T_{SW}$ the pulse widths have reached 99% of the desired set-point width for a pulse width modulation controller Vgdrvr 101 with accuracy no better than 1%.

While in its strictest mathematical sense, u(t) fails to meet the requirements of a function, engineers have referred to u(t) as the unit step forcing function as a widely accepted artifice, and this specification will use u(t) in such a conventional manner hereinafter.

FIG. 2 equations 200 and 201 present $T_{Set(p)}$ defined as the period of a pulse width that provides the desired set-point for a given discrete power state p. For an open loop control system $T_{Set(p)}$ equals the switching period $T_{SW}$ times the ideal voltage gain $A_{V(p)}$ times the dynamic error compensation coefficient, $A_{DE(p)}$ as given in the reference patent application Ser. No. 11/549,586. The reference patent application Ser.

No. 11/549,586 defines the ideal voltage gain $A_{V(p)}$ equal to Vcore 108 divided by Vin 103 assuming no loss through the physical switching element. The reference patent application Ser. No. 11/549,586 also defines $A_{DE(p)}$ as a coefficient which compensates for dynamic error caused by loss of power from non-ideal physical behavior in said switching elements, equal to Vcore 108 divided by the quantity Vin 103 times $A_{V(p)}$ after the transition has settled to the steady state of the next discrete power state. Both of the aforementioned coefficients exist as a plurality of unique instances in a given system, one for each discrete power state identified uniquely by index p. For a closed loop control system $T_{Set(p)}$ equals the switching period $T_{SW}$ times the ideal voltage gain $A_{V(p)}$ times the dynamic error compensation coefficient, $A_{DE(p)}$ times $A_{TP(p)}$. The coefficient $A_{TP(p)}$ comprises the ratio of actual propagation delay through a logic delay chain relative to expected worst case propagation delay through the logic delay chain plus safety margin for the given discrete power state when powering a semiconductor core as depicted in the reference patent application Ser. No. 11/549,586. Using these two definitions of $T_{Set(p)}$ in this specification of the present invention, equation 201 thus applies to both open and closed loop control systems, as did equation 200 from the reference patent application Ser. No. 11/549,586. Only now, the present invention does so in order to maintain maximally flat voltage during current transients with equation 201 as a natural extension of equation 200.

Given the above definitions of $T_{Set(p)}$, one readily can directly comprehend the use of variable $\Delta T_{Set(m)}$ in equations 200 and 201. One may most concisely define $\Delta T_{Set(m)}$ as the change in the period of the width of the pulses during state a transition identified uniquely by index m from one system power state identified uniquely by index p to the next system power state identified uniquely by index p+1 such that said $\Delta T_{Set(m)}$ equals $T_{set(p+1)}$ minus $T_{Set(p)}$. While the reference patent application Ser. No. 11/549,586 makes claims of the magnitude $|\Delta T_{Set(m)}|$ providing means to reduce complexity and resources necessary to implement the pulse width modulation controller Vgdrvr 101 based on symmetry of transitions, here the discussion uses this variable primarily as shorthand notation within equation 201.

The two remaining variables of equations 200 and 201, t and $\omega_0$, one of ordinary skill in the art should immediately recognize as time in seconds, and the resonant frequency in radians per second, commonly known most directly equal to one over the square root of the value of L 107 times C 109, respectively.

The present invention's substantial departure from prior art and significant novelty exists in the preferred embodiment wherein the use of $n_0$ and $A_{Ierr(m)}$ in equation 201 enables the system to maintain maximally flat voltage during current transients of greater magnitude, or enables control plant components of values that exhibit greater voltage instability for ordinary current transients to maintain maximally flat voltage more optimally than equation 200. Obviously setting $n_0$ equal to 0 and $A_{Ierr(m)}$ equal to 1 reduces equation 201 to equation 200, further proving validity based on preceding proof of the validity of equation 200. Now this specification will further define $A_{Ierr(m)}$ and disclose simple means of approximating its values toward attaining the goal of maximally flat voltage during current transients.

Equations 202, 203, and 206 estimate values for $A_{Ierr(m)}$ based on values found empirically for $A_{Verr(m)}$ as defined in equation 204. The reference patent application Ser. No. 11/549,586 reveals use of tools such as a computer spreadsheet program that generates the simulation code for use within a Simulation Program with Integrated Circuit Emphasis commonly known as SPICE to those of ordinary skill in the art. The notion of generation of SPICE code alludes to a quick method of verifying the flatness of voltage in response to current transients whereas reference patent application Ser. No. 11/549,586 also suggested a mathematical computation tool that may perform such an operation as convolution which could equally perform the task of verifying the flatness of voltage in response to current transients. The approach incorporating the use of SPICE offers the advantage of having graphical or syntactic symbols of plant elements usually within a library physically characterized by vendors of such parts with which the user more directly simulates higher order systems in a hierarchical fashion versus laboring with a mathematics tool over behavioral models of questionable accuracy. Nonetheless, while probably less productive for certain applications, the use of a mathematical computation tool which performs symbolic convolution may hold advantages or provide the only means of system modeling in certain applications and thus remains well within the scope and spirit of the present invention. The iterative process of analysis and verification including SPICE simulation determines how substantially any change in current affects the output voltage Vcore 108 and thus if the transition m requires application of values of $A_{Ierr(m)}$ equal to something other than one or $n_0$ equal to something other than 0 within the transition function that equation 201 describes. With SPICE one may quickly determine the value of $A_{Verr(m)}$ as depicted symbolically in equation 204 and graphically in the hypothetical time domain plots 300 and 310 of FIG. 3 and from there estimate a value for $L_m$ using equation 205 in order to approximate $A_{Ierr(m)}$ and reduce $A_{Verr(m)}$ in an iterative analysis and verification simulation process.

Figure 3:
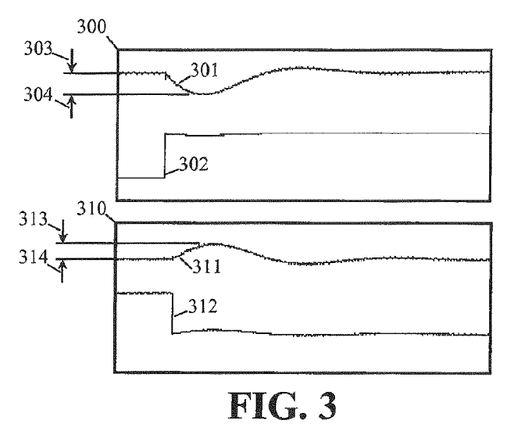
FIG. 3 illustrates two time domain plots of hypothetical system output voltages during current transients.

FIG. 3 illustrates two time domain plots 300 and 310 of hypothetical current transitions, a current transient 302 going from a lower to higher power state in plot 300 is and a current transient 312 going from a higher to lower power state. In the former hypothetical transition, the voltage 301 droops in response to this current transient 302, and one may measure the amplitude of the droop 301, symbolized by the function $\max |V_m(t)-V_{Set(m)}|$ in equation 204, by determining the voltage difference between dimension lines 303 and 304. Subtracting the voltage value at dimension line 303 from that at dimension line 304 then dividing that quantity by the voltage value at dimension line 303 yields the value for $A_{Verr(m)}$, as shown in equation 204, in this case less than zero. Following the stipulations of magnitude less than, or greater than or equal to 5% determines whether equation 202 or equation 206 provides the best estimate for $A_{Ierr(m)}$. As $A_{Verr(m)}$ attained a negative value in this example and $L_m$ always evaluates greater than zero, this ensures $A_{Ierr(m)}$ attains a value somewhat greater than one given by equation 202 or 206, in order to compensate for the droop 301 caused by the current transient 302. In a similar manner, the latter hypothetical transition of plot 310, the voltage 311 peaks in response to a current transient 312 going from a higher to lower power state. Again, one may measure the amplitude of the peak 311, by determining the voltage difference between dimension lines 313 and 314. Subtracting the voltage value at dimension line 314 from that at dimension line 313 then dividing that quantity by the voltage value at dimension line 314 yields the value for $A_{Verr(m)}$, as shown in equation 204, in this case greater than zero. Once again following the stipulations of magnitude less than, or greater than or equal to 5% determines whether equation 203 or equation 206 provides the best estimate for $A_{Ierr(m)}$. As $A_{Verr(m)}$ attained a positive value in this example and $L_m$ always evaluates greater than zero, this ensures $A_{Ierr(m)}$ attains a value somewhat less than one given by equation 203 or 206, in order to compensate for the peak 311 caused by the current transient 312. Several points one may consider in these methods of approximation, the inventor found varying accuracy in the estimate of $L_m$ in equation 205. For the values of $A_{Verr(m)}$ of magnitude less than 5% the method detailed in equations 202 through 205 yielded results of less than 1.5% amplitude fluctuation, whereas the results, albeit substantially better than before applying $A_{Ierr(m)}$, could at best converge just within 5% for $A_{Verr(m)}$ given an uncompensated $A_{Verr(m)}$ greater than 25%. One will immediately observe in these cases of high magnitude current transients or extreme voltage instability prior to contributing $A_{Ierr(m)}$ compensation, the term $T_{Set(p+1)}(A_{Ierr(m)})$ in equation 201 may attain a value less than zero or greater than $T_{SW}$ which immediately implies a pulse skipping mode for the pulse width modulation controller Vgdrvr 101. Further iterations in the simulation analysis and verification process allow one to determine if $n_0$ should acquire a value of less than zero, or if $L_m$ should acquire a smaller estimate for these cases of extreme voltage instability. This specification will subsequently further examine maximal flatness and other criterion engaged in the aforementioned processes.

Figure 4:
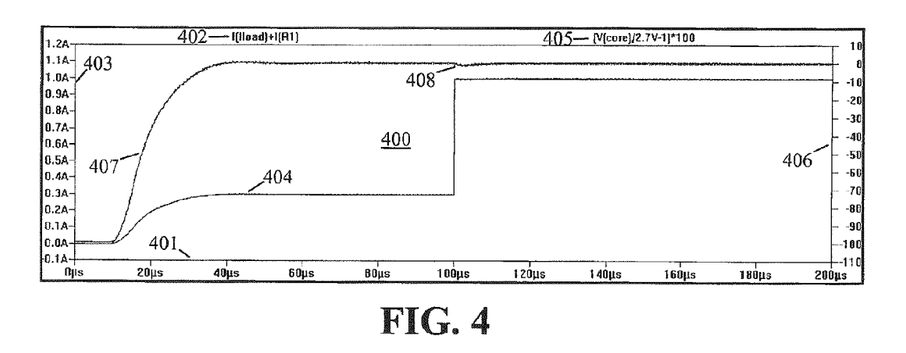
FIG. 4 illustrates a time domain plot of possible transitions in an exemplary system operating under the control of one embodiment of the present invention.

FIG. 4 through FIG. 9 provide results from varying physical parameters during simulation and thus further define "maximal flatness" of output voltage in response to current transients in an actual realizable system. This specification of the present invention will hereinafter use the notation of $A_{Verr(m)}$ to refer to the voltage instability amplitude prior to contributing $A_{Ierr(m)}$ and $n_0$ compensation, and $A_{Verr(m)}'$ to refer to the voltage instability amplitude after applying any of the previously described techniques. FIG. 4 illustrates a time domain response plot 400 from a simulation comprising two transitions of power states for an exemplary embodiment of the present invention. As shown in all response plots starting from plot 400, of FIG. 4 through response plot 900 of FIG. 9, inclusively, the left vertical axis 403 displays a scale of amperes that apply to the legend 402 indicating the sum of currents into model loads ILoad 110 and R 111 in the schematic plot 100 of FIG. 1. ILoad 110 transitions at a rate of +/−20 amperes per microsecond at simulation time 100 microseconds in all plots 400 through plot 900 of FIG. 4 through FIG. 9 inclusive. Also common to all these plots 400 through 900 inclusive, along the right vertical axis 406 appears the normalized set-point scale for the voltage amplitude given in percent of deviation from the set-point. The horizontal axes 401 of all the plots in FIG. 4 through FIG. 9 inclusive all display units of time in microseconds. The legend 405 affixes a physical value of 2.7 volts to the normalized set-point value for these particular examples in plot 400 of FIG. 4 and plot 500 of FIG. 5. Plot 400 of FIG. 4 depicts load current 404 first rising to 300 milliamperes while the voltage 407 rises to its set-point, then at 100 microseconds into the simulation the current 404 rises to one ampere. The reference patent application Ser. No. 11/549,586 thoroughly discloses techniques for controlling the first transition particularly for the voltage 407 rising to its set-point exhibiting a near critical damped step response and therefore this specification will discuss this transition no further. In plot 400 as the current 404 transitions from 300 milliamperes to one ampere at the 100 microsecond simulation time, the voltage 407 displays a droop 408 typical of power supply systems. The simulation of plot 400 pertains to plant components as modeled in schematic plot 100 of FIG. 1 having values of L 107 equal to 1 μH, C 109 equal to 22 μF with a Vin 103 equal to six volts. The switching element in all simulations from FIG. 4 through FIG. 9 inclusive, transistors 104 and 105 comprise the dual complementary field effect transistor package, the Si5513DC commercially available from the Vishay Siliconix Corporation along with the SPICE model physically characterized for this pair of transistors 104, 105. Prior to application of equation 202, 204, 205, $A_{Verr(m)}$ equaled −3.91%, which probably lies within regulation limits for most systems, but upon applying the aforementioned equations, the $A_{Verr(m)}'$ improved to −1.35%. Upon converging to this value of $A_{Verr(m)}'$ equation 201 acquired coefficients $n_0$ equal to zero, $n_1$ equal to three, $n_2$ equal to six, and $L_m$ equal to 2.33.

Figure 5:
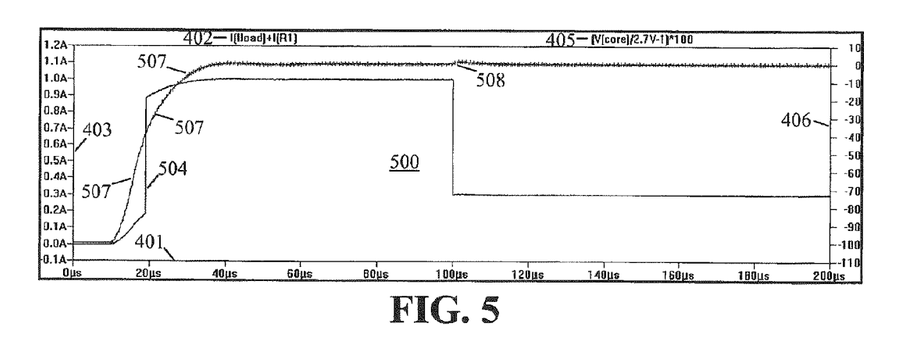
FIG. 5 illustrates a time domain plot of possible transitions in an exemplary system operating under the control of one embodiment of the present invention.

Plot 500 of FIG. 5 illustrates results of simulations based on plant parameters equivalent to those of plot 400 of FIG. 4. The only difference in plot 500 compared to plot 400 manifests in the current transition 504 proceeding from a higher to lower power state and thus the voltage 507 displays a peak 508. In this instant, $A_{Verr(m)}$ equaled 3.99%, which again probably lies within regulation limits for most systems, but upon application of equations 203, 204, and 205 the $A_{Verr(m)}'$ improved to 1.34%. Both voltage measurements in plot 400 and plot 500 appear equal to within limits of measurement error. Upon converging to this value of $A_{Verr(m)}'$ equation 201 again acquired coefficients $n_0$ equal to zero, $n_1$ equal to three, $n_2$ equal to six, and $L_m$ equal to 2.33.

Figure 6:
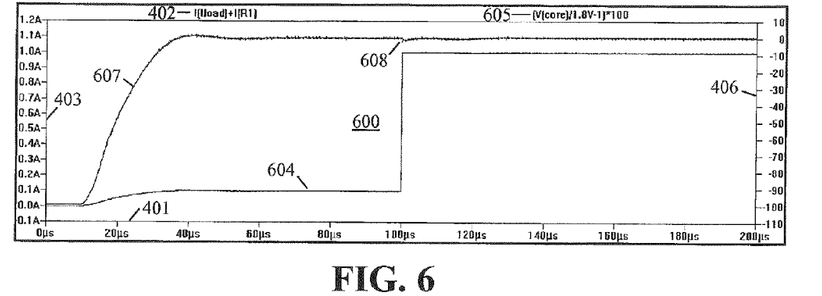
FIG. 6 illustrates a time domain plot of possible transitions in an exemplary system operating under the control of one embodiment of the present invention.

The simulation of plot 600 of FIG. 6 pertains to plant components as modeled in schematic plot 100 of FIG. 1 having values of L 107 equal to 1 μH, and C 109 equal to 22 μF as before. Only now, Vin 103 equals 3.3 volts and load current 604 first rises to 100 milliamperes while the voltage 607 rises to its set-point of 1.8 volts, then at 100 microseconds into the simulation the current 604 rises to one ampere. Hereinafter the legend 605 affixes a physical value of 1.8 volts to the normalized set-point given in percent deviation from the set-point on the right vertical scale 406 for these particular examples in plot 600 of FIG. 6 through plot 900 of FIG. 9 inclusive. For this particular set of conditions, $A_{Verr(m)}$ equaled −6.82%. Consequently, voltage instability of this magnitude dictates use of equations 204, 205, 206 in order to converge to a maximally flat voltage in response to the given current 604 transient. In this instance, the designer chose an estimate lower than that defined in equation 205 of $L_m$ equal to eight and acquired coefficients $n_0$ equal to zero, $n_1$ equal to one, and $n_2$ equal to eight, to converge on $A_{Verr(m)}'$ equal to −1.33% as shown by the voltage droop 608. The choice of reducing the estimate for $L_m$ originates from the perception during the iterative process of analysis and verification by simulation that equation 205 overestimated $L_m$ and a less coarse adjustment to the pulse width modulation sequence facilitated quicker convergence towards satisfactory output stability.

Figure 7:
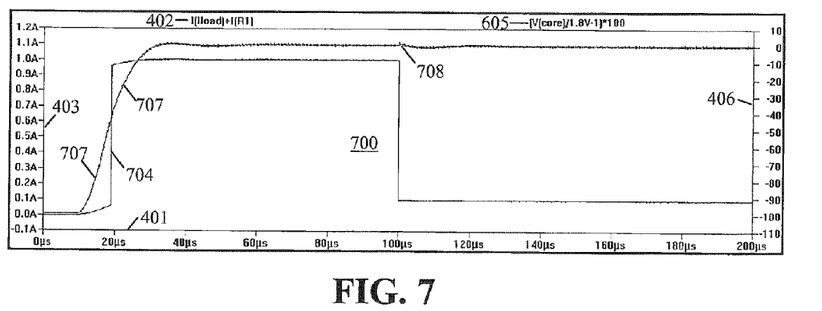
FIG. 7 illustrates a time domain plot of possible transitions in an exemplary system operating under the control of one embodiment of the present invention.

Plot 700 of FIG. 7 illustrates the results given the exact same set of conditions prevailing over the simulation portrayed in plot 600, with the exception of the current 704 first rising to 1 ampere then falling to 100 milliamperes during the transient time of interest. In this case, the voltage 707 first exhibited a peak 708 measuring an $A_{Verr(m)}$ equal to 8.77%, whereby this voltage instability again dictated use of equations 204, 205, 206 in order to converge to a maximally flat voltage in response to the given current 704 transient. In this instance, the designer again chose a lower estimate of $L_m$ now equal to seven and acquired coefficients $n_0$ equal to zero, $n_1$ equal to one, and $n_2$ equal to fifteen, to converge on a $A_{Verr(m)}'$ equal to 1.12%.

Figure 8:
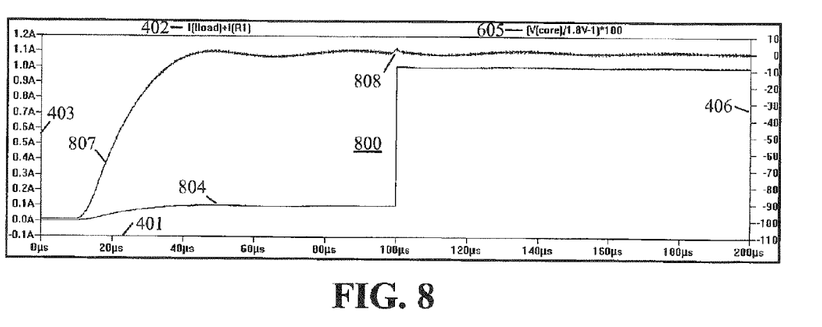
FIG. 8 illustrates a time domain plot of possible transitions in an exemplary system operating under the control of one embodiment of the present invention.
Figure 9:
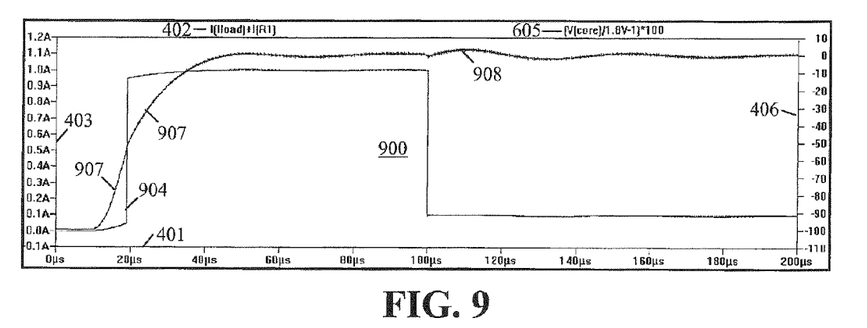
FIG. 9 illustrates a time domain plot of possible transitions in an exemplary system operating under the control of one embodiment of the present invention.

Plot 800 of FIG. 8 and plot 900 of FIG. 9 direct the discussion toward plant values less amenable to maintaining a maximally flat voltage during current transitions of somewhat larger than ordinary magnitude. In accordance with the plant components given in columns 13 and 14 of reference U.S. Pat. No. 6,940,189, those modeled in schematic plot 100 of FIG.

1 have values of L 107 equal to 4.7 μH, and C 109 equal to 10 μF for the simulations generating plot 800 and plot 900. While plant components of these values extend the continuous conduction mode well below 100 milliamperes of load current, these values also tend to cause voltage instability of greater amplitude for current transients 804, 904 comparable to the current transients 604, 704 from the previous two plots 600, 700 taken with components of differing capacitive to inductive proportions. In the instance of plot 800 of FIG. 8, the voltage 807 displayed a droop (not shown) equating $A_{Verr(m)}$ to −28.28%. In this particular example, the term $T_{Set(p+1)}$ ($A_{Ierr(m)}$) in equation 201 exceeded $T_{SW}$ thus leaving the choice of skipping pulses by driving a continuous DC voltage equal to Vin 103 over the period $n_1 T_{SW} - n_0 T_{SW}$, or else adjusting the estimate of $L_m$ in equation 205 downward. As convergence did not appear possible for a lesser value of $L_m$, the designer chose the method of pulse skipping setting $n_0$ equal to −2; $n_1$ to one; and $n_2$ infinite, i.e. no exponential scaling necessary to converge to a maximally flat voltage 808 over this given current transient. For this particular example the voltage 808 response produced a value of $A_{Verr(m)}'$ equal to 2.45%.

For the example of plot 900 of FIG. 9, the term $T_{Set(p+1)}$ ($A_{Ierr(m)}$) in equation 201 equaled less than zero as before leaving no choice but to skip pulses this time by driving a continuous zero volts over the period $n_1 T_{SW} - n_0 T_{SW}$. Setting $n_0$ equal to −1; $n_1$ to one; and $n_2$ infinite, i.e. no exponential scaling necessary to converge to a maximally flat voltage 908 over this given current transient, for this particular example the voltage 908 response resulted in a value of $A_{Verr(m)}'$ equal to 3.24%, compared to the uncompensated peak in voltage 907 equaling an $A_{Verr(m)}$ of 27.64%.

While the examples of FIG. 8 and FIG. 9 purport the possibility of convergence to a maximally flat voltage response despite extreme uncompensated voltage instability, a more preferable method likely includes reverting, if the design permits, to plant components nearer to the capacitive to inductive proportions, a higher quality factor, like that of the previous examples. Although the range of continuous conduction mode decreases for lesser values of inductor, the tolerance range for loads and component tolerances relax for higher quality factor plants as in the first four examples of FIG. 4 through FIG. 7 compared to the lower quality factor of the plant in the examples of FIG. 8 and FIG. 9. As one of ordinary skill in the art may already know, a higher quality factor for the plant facilitates maintaining a maximally flat voltage in response to greater current transients over a wider tolerance of characterized loads and plant component values. Since the advent of the reference U.S. Pat. No. 6,940,189, molybdenum permalloy powder "distributed gap" cores for inductors have proliferated the marketplace availing designers to inductors that retain 5% tolerance in inductance over the range of current described therein. In addition, X7R ceramic materials that retain a capacitance tolerance within 10% over the bias voltage described therein have reached a cost effective price. Both of these inductive and capacitive components of advanced materials retain these tolerances while operating over the 0-to-70 degree Celsius temperature range. Thus, the present invention and its ability to compensate for plant component value deviations along with components of advanced materials, satisfy a wide range of applications. These design examples represent several of many possible configurations within the scope of the present invention and one must view these configurations as exemplary, not restrictive.

According to the reference U.S. Pat. No. 6,940,189 relating to the function of a bus bringing an offset value input from binary pads, the present invention offers some alternate embodiments wherein the hypothetical use of this offset corrects for the values stored underestimating or overestimating the actual values of plant components, current transients, or voltage instability amplitudes. Once verified empirically, the present invention may use these offset values to compensate any voltage instability due to any current transient by adjusting $n_0$, $n_1$, $n_2$, $L_m$, $A_{Verr(m)}$, or $A_{Ierr(m)}$ in accordance with any of the aforementioned compensating techniques for any of the exemplary embodiments of the control plant. Let it be known that minor deviations or omissions, partial or complete non-implementation of this offset adjusting mechanism does not constitute a substantial departure beyond the scope of the present invention.

In closing, one may note that while this specification depicted the application of the present invention in rote fashion, any embodiment which automates these rote processes does not constitute a departure from the scope and spirit of the present invention. For instance, any computer program, computer script, spreadsheet, simulation tool, or other design automation, or test and measurement tool that automates: the aforementioned time domain tuning; the generation or adjustments to variables or coefficients $n_0$, $n_1$, $n_2$, $L_m$, $A_{Ierr(m)}$, $A_{Verr(m)}$, $T_{SW}$; the generation or alteration of a hardware description language that specifies or models the control plant such as, but not limited to, VHDL, Verilog HDL, or System C, et cetera; the generation of pulse skipping; or analysis such as margining the plant component capacitance, inductance, quality factor, switching loss, load current values, voltage deviations, or Monte Carlo analysis, clearly does not present a substantial departure from the scope and spirit of the present invention.

From the preceding description of the present invention, this specification manifests various techniques for use in implementing the concepts of the present invention without departing from its scope. Furthermore, while this specification describes the present invention with specific reference to certain embodiments, a person of ordinary skill in the art would recognize that one could make changes in form and detail without departing from the scope and the spirit of the invention. This specification presented embodiments in all respects as illustrative and not restrictive. All parties must understand that this specification does not limited the present invention to the previously described particular embodiments, but asserts the present invention's capability of many rearrangements, modifications, omissions, and substitutions without departing from its scope.

Thus, a pulse width modulation sequence maintaining maximally flat voltage during current transients has been described.

What is claimed is:

1. A control system for providing, in a parallel resonant LRC circuit, a maximally flat voltage in a pulse width modulation control scheme, the control system comprising:
a controller configured to control switching elements of a switched mode pulse width modulated power supply to output a predetermined pulse sequence to the circuit, the predetermined pulse sequence including pulses having predetermined scaled pulse widths respectively determined to collectively provide a maximally flat voltage response in the circuit for a current transient of a predetermined power state transition in the circuit based on a predefined model of the circuit, the predefined model including at least analogous elements of inductance, capacitance, load, and power switching characteristics.

2. The control system of claim 1, wherein the scaled pulse widths of the pulses of the predetermined pulse sequence are determined in accordance with a state transition drive function comprising an initializing term having a coefficient determined based on the analogous elements of the predefined model.

3. The control system of claim 2, wherein the initializing term causes the controller to control the switching elements of the pulse width modulated power supply to scale a pulse width of each pulse of a predetermined initializing pulse sequence in accordance with a same fixed value based on a final steady state set point of pulse widths for the predetermined state transition.

4. The control system of claim 2, wherein the initializing term comprises an anticipating pulse sequence coefficient that causes the controller to control the switching elements of the pulse width modulated power supply to scale pulse widths of pulses for a predetermined initializing pulse sequence that anticipates the predetermined state transition.

5. The control system of claim 2, wherein the initializing term comprises a current transient compensation coefficient that causes the controller to control the switching elements of the pulse width modulation power supply to modify the predetermined scaled pulse width of pulses for a predetermined initializing pulse sequence to compensate for a circuit response characteristic or a predefined current transient characteristic of the predetermined state transition.

6. The control system of claim 2, wherein the initializing term comprises
   (i) an anticipating pulse sequence coefficient that causes the controller to control the switching elements of the pulse width modulated power supply to scale pulse widths of pulses for a predetermined initializing pulse sequence that anticipates the predetermined state transition, and
   (ii) a current transient compensation coefficient that causes the controller to control the switching elements of the pulse width modulation power supply to modify the predetermined scaled pulse width of pulses for the predetermined pulse sequence to compensate for a circuit response characteristic or a predefined current transient characteristic of the predetermined state transition.

7. The control system of claim 2, wherein the controller is configured to adjust at least one coefficient of the state transition drive function based on an environmental condition.

8. The control system of claim 2, wherein the predefined model comprises non-ideal circuit elements, and the state transition drive function comprises a coefficient that compensates for dynamic error caused by loss of power from non-ideal physical behavior in the circuit elements.

9. The control system of claim 2, wherein the controller is configured to determine a compensated coefficient of the state transition drive function based on data representing elements of the predefined model and data representing the corresponding elements of the circuit.

10. The control system of claim 2, wherein the state transition drive function further comprises a time domain critical damped step response function teen having a coefficient determined based on the analogous elements of the predefined model.

11. The control system of claim 10, wherein the controller is configured to control the switching elements of the pulse width modulated power supply to output a predetermined pulse sequence including pulses having scaled pulse widths determined in accordance with a continuous time function comprising:

$$(1-(1+\omega_0 t)e^{-\omega_0 t})$$

wherein $\omega_0$ is a resonant frequency in radians per second of the predefined model of the circuit;

wherein t is time in seconds after initiation of the predetermined state transition; and wherein e is a constant equal to the mathematical base of natural logarithms.

12. The control system of claim 10, wherein the controller is configured to control the switching elements of the pulse width modulated power supply to output a predetermined pulse sequence including pulses having scaled pulse widths determined in accordance with a discrete time function comprising:

$$(1-(1+\omega_0(n+n_2)T_{sw})e^{-\omega_0(n+n_2)T_{sw}})$$

wherein $\omega_0$ is a resonant frequency in radians per second of the predefined model of the circuit;

wherein n is a discrete index of time that counts pulses starting at the initiation of the predetermined state transition;

wherein $n_2$ is a discrete variable for fine tuning a response of the analogous elements of the predefined model of the circuit;

wherein $T_{SW}$ is a time of a switching period in seconds in accordance with the power switching characteristics; and wherein e is a constant equal to the mathematical base of natural logarithms.

13. The control system of claim 1, wherein the controller is configured to control the switching elements of the pulse width modulated power supply to output a predetermined pulse sequence including pulses having scaled pulse widths determined in accordance with a discrete time function:

$$x_m(t) = V_{sw} \sum_{n=n_0}^{N} (u(t-t_0-n_0 T_{sw}) - u(t-t_0-n_1 T_{sw}))[u(t-t_0-nT_{sw}) -$$
$$u(t-t_0-nT_{sw}-T_{Set(p+1)}(A_{Ierr(m)}))] +$$
$$u(t-t_0-n_1 T_{sw})[u(t-t_0-nT_{sw}) - u(t-t_0-nT_{sw} -$$
$$(T_{Set(p)} + (\Delta T_{Set(m)})(1-(1+\omega_0(n+n_2)T_{sw})e^{-\omega_0(n+n_2)T_{sw}})))]$$

wherein $x_m(t)$ is a time domain function defining the pulses output to the circuit during the predetermined pulse sequence for the predetermined state transition identified uniquely by an index m;

wherein $V_{SW}$ is an amplitude of a pulse of the predetermined pulse sequence input to the circuit;

wherein n is a discrete index of time that counts pulses starting at $n_0$, where $n_0$ is an integer value and $n_0=0$ corresponds to initiation of the predetermined state transition;

wherein N is a practical upper limit of a number of pulses coincidental to a pulse width of the predetermined pulse sequence having reached a final steady state set point for the predetermined state transition to within a desired accuracy of the control system;

wherein u(t) is a mathematical artifice representing a unit step function;

wherein t is time in seconds;

wherein $t_0$ specifies an arbitrary instant in time corresponding to the initiation of the predetermined state transition;

wherein $n_1$ is a discrete variable denoting a number of the pulses starting at the initiation of the predetermined state transition within which pulses of the predetermined pulse sequence initially assume their final set point value so as to provide a precise amount of power to maintain a substantially maximally flat voltage for the predetermined state transition;

wherein $T_{SW}$ is a time of a switching period in seconds in accordance with the power switching characteristics;

wherein $T_{Set(p)}$ is a pulse width during a steady state set point for a predefined system power state identified uniquely by index p;

wherein $A_{Ierr(m)}$ is a current transient compensation coefficient based on a circuit response characteristic or a predefined current transient characteristic;

wherein $\Delta T_{Set(m)}$ is a change in pulse width during the predetermined state transition identified uniquely by the index m from the predetermined system power state uniquely identified by the index p to a predetermined system power state identified uniquely by index p+1 such that $\Delta T_{Set(m)} = T_{Set(p+1)} - T_{Set(p)}$;

wherein $\omega_0$ is a resonant frequency in radians per second of the predefined model of the circuit;

wherein $n_2$ is a discrete variable for fine tuning a response of the analogous elements of the predefined model of the circuit; and wherein e is a constant equal to the mathematical base of natural logarithms.

14. The control system of claim 13, further comprising memory or logic configured to store the coefficient $\Delta T_{Set(m)}$ as an absolute value, and wherein the controller is configured to control the switching elements of the pulse width modulated power supply to output the predetermined pulse sequence including pulses having scaled pulse widths respectively determined in accordance with the discrete time function to reversibly provide a maximally flat voltage response in the circuit for the predetermined state transition of the circuit by adding or subtracting the absolute value of the coefficient $\Delta T_{Set(m)}$.

15. A method for providing, in a parallel resonant LRC circuit, a maximally flat voltage in a pulse width modulation control scheme, the method comprising:

providing power to switching elements of a switched mode pulse width modulated power supply; and controlling the switching elements of the pulse width modulated power supply to output a predetermined pulse sequence to the circuit, the predetermined pulse sequence including pulses having predetermined scaled pulse widths respectively determined to collectively provide a maximally flat voltage response in the circuit for a current transient of a predetermined power state transition of the circuit based on a predefined model of the circuit, the predefined model including analogous elements of inductance, capacitance, load, and power switching characteristics.

16. The method of claim 15, wherein said controlling the switching elements of the pulse width modulated power supply comprises respectively determining the scaled pulse widths of the pulses of the predetermined pulse sequence in accordance with a state transition drive function comprising an initializing term having a coefficient determined based on the analogous elements of the predefined model.

17. The method of claim 16, wherein said controlling the switching elements of the pulse width modulated power supply in accordance with the initializing term of the state transition drive function comprises controlling the switching elements of the pulse width modulated power supply to scale a pulse width of each pulse of a predetermined initializing pulse sequence in accordance with a same fixed value based on a final steady state set point of pulse widths for the predetermined state transition.

18. The method of claim 16, wherein said controlling the switching elements of the pulse width modulated power supply in accordance with the initializing term of the state transition drive function comprises controlling the switching elements of the pulse width modulated power supply in accordance with an anticipating pulse sequence coefficient that causes the controller to control the switching elements of the pulse width modulated power supply to scale pulse widths of pulses for a predetermined initializing pulse sequence that anticipates the predetermined state transition.

19. The method of claim 16, wherein said controlling the switching elements of the pulse width modulated power supply in accordance with the initializing term of the state transition drive function comprises controlling the switching elements of the pulse width modulation power supply in accordance with a current transient compensation coefficient that causes the controller to modify the predetermined scaled pulse width of pulses for a predetermined initializing pulse sequence to compensate for a circuit response characteristic or a predefined current transient characteristic of the predetermined state transition.

20. The method of claim 16, wherein said controlling the switching elements of the pulse width modulation power supply in accordance with the initializing term of the state transition drive function comprises controlling the switching elements of the pulse width modulation power supply in accordance with (i) an anticipating pulse sequence coefficient that causes the controller to control the switching elements of the pulse width modulated power supply to scale pulse widths of pulses for a predetermined initializing pulse sequence that anticipates the predetermined state transition, and (ii) a current transient compensation coefficient that causes the controller to control the switching elements of the pulse width modulation power supply to modify the predetermined scaled pulse width of pulses for the predetermined initializing pulse sequence to compensate for a circuit response characteristic or a predefined current transient characteristic of the predetermined state transition.

21. The method claim 16, wherein said controlling the switching elements of the pulse width modulated power supply in accordance with the state transition drive function comprises adjusting at least one coefficient of the state transition drive function based on an environmental condition.

22. The method of claim 16, wherein the predefined model of the circuit comprises non-ideal circuit elements, and the state transition drive function comprises a coefficient that compensates for dynamic error caused by loss of power from non-ideal physical behavior in the circuit elements.

23. The method of claim 16, wherein said controlling the switching elements of the pulse width modulated power supply comprises determining a compensated coefficient of the state transition drive function based on data representing elements of the predefined model and data representing the corresponding elements of the circuit.

24. The method of claim 16, wherein said controlling the switching elements of the pulse width modulated power supply comprises respectively determining the scaled pulse widths of the pulses of the predetermined pulse sequence in accordance with a state transition drive function further comprising a time domain critical damped step response function term having a coefficient determined based on the analogous elements of the predefined model.

25. The method of claim 24, wherein said controlling the switching elements of the pulse width modulated power supply comprises controlling the switching elements of the pulse width modulated power supply to output a predetermined pulse sequence including pulses having scaled pulse widths determined in accordance with a continuous time function comprising:

$$(1-(1+\omega_0 t)e^{-\omega_0 t}) \qquad 5$$

wherein $\omega_0$ is a resonant frequency in radians per second of the predefined model of the circuit;
wherein t is time in seconds after initiation of the predetermined state transition; and:
wherein e is a constant equal to the mathematical base of natural logarithms.

26. The method of claim 24, wherein said controlling the switching elements of the pulse width modulated power supply comprises controlling the switching elements of the pulse width modulated power supply to output a predetermined pulse sequence including pulses having scaled pulse widths determined in accordance with a discrete time function comprising:

$$(1-(1+\omega_0(n+n_2)T_{sw})e^{-\omega_0(n+n_2)T_{sw}}) \qquad 20$$

wherein $\omega_0$ is a resonant frequency in radians per second of the predefined model of the circuit;
wherein n is a discrete index of time that counts pulses starting at the initiation of the predetermined power state transition;
wherein $n_2$ is a discrete variable for fine tuning a response of the analogous elements of the predefined model of the circuit;
wherein $T_{SW}$ is a time of a switching period in seconds in accordance with the power switching characteristics; and
wherein e is a constant equal to the mathematical base of natural logarithms.

27. The method of claim 15, wherein said controlling the switching elements of the pulse width modulated power supply comprises controlling the switching elements of the pulse width modulated power supply to output a predetermined pulse sequence including pulses having scaled pulse widths determined in accordance with a discrete time function:

$$x_m(t) = V_{sw} \sum_{n=n_0}^{N} (u(t-t_0-n_0T_{sw}) - u(t-t_0-n_1T_{sw}))[u(t-t_0-nT_{sw}) -$$
$$u(t-t_0-nT_{sw}-T_{Set(p+1)}(A_{Ierr(m)}))] +$$
$$u(t-t_0-n_1T_{sw})[u(t-t_0-nT_{sw}) - u(t-t_0-nT_{sw} -$$
$$(T_{Set(p)} + (\Delta T_{Set(m)})(1-(1+\omega_0(n+n_2)T_{sw})e^{-\omega_0(n+n_2)T_{sw}})))]$$

wherein $x_m(t)$ is a time domain function defining the pulses output to the circuit during the predetermined pulse sequence for the predetermined power state transition identified uniquely by an index m;
wherein $V_{SW}$ is an amplitude of a pulse of the predetermined pulse sequence input to the circuit;
wherein n is a discrete index of time that counts pulses starting at $n_0$, where $n_0$ is an integer number and $n_0=0$ corresponds to initiation of the predetermined state transition;
wherein N is a practical upper limit of a number of pulses coincidental to a pulse width of the predetermined pulse sequence having reached a final steady state set point for the predetermined state transition to within a desired accuracy of the control system;
wherein u(t) is a mathematical artifice representing a unit step function;

wherein t is time in seconds;
wherein $t_0$ specifies an arbitrary instant in time corresponding to the initiation of the predetermined power state transition;
wherein $n_1$ is a discrete variable denoting a number of the pulses starting at the initiation of the predetermined power state transition within which pulses of the predetermined pulse sequence initially assume their final set point value so as to provide a precise amount of power to maintain a substantially maximally flat voltage for the predetermined power state transition;
wherein $T_{SW}$ is a time of a switching period in seconds in accordance with the power switching characteristics;
wherein $T_{Set(p)}$ is a pulse width during a steady state set-point for a predefined system power state identified uniquely by index p;
wherein $A_{Ierr(m)}$ is a current transient compensation coefficient based on a circuit response characteristic or a predefined current transient characteristic;
wherein $\Delta T_{Set(m)}$ is a change in pulse width during the predetermined power state transition identified uniquely by the index m from the predetermined system power state uniquely identified by the index p to a predetermined system power state identified uniquely by index p+1 such that $\Delta T_{Set(m)} = T_{Set(p+1)} - T_{Set(p)}$;
wherein $\omega_0$ is a resonant frequency in radians per second of the predefined model of the circuit;
wherein $n_2$ is a discrete variable for fine tuning a response of the analogous elements of the predefined model of the circuit; and
wherein e is a constant equal to the mathematical base of natural logarithms.

28. The method of claim 27, further comprising storing the coefficient $\Delta T_{Set(m)}$ as an absolute value in memory or logic, and wherein said controlling the switching elements of the pulse width modulated power supply comprises controlling the switching elements of the pulse width modulated power supply to output a predetermined pulse sequence including pulses having scaled pulse widths respectively determined in accordance with the discrete time function to reversibly provide a maximally flat voltage response in the circuit for the predetermined state transition of the circuit by adding or subtracting the absolute value of the coefficient $\Delta T_{Set(m)}$.

29. A system for providing, in a parallel resonant LRC circuit, a maximally flat voltage in a pulse width modulation control scheme, the method comprising:
means for providing power to switching elements of a switched mode pulse width modulated power supply; and
means for controlling the switching elements of the pulse width modulated power supply to output a predetermined pulse sequence to the circuit, the predetermined pulse sequence including pulses having predetermined scaled pulse widths respectively determined to collectively provide a maximally flat voltage response in the circuit for a current transient of a predetermined power state transition of the circuit based on a predefined model of the circuit, the predefined model including at least analogous elements of inductance, capacitance, load, and power switching characteristics.

30. A non-transient computer-readable storage medium having stored thereon computer executable instructions, execution of which by a computing device causes the computing device to perform operations for providing, in a parallel resonant LRC circuit, a maximally flat voltage in a pulse width modulation control scheme, the operations comprising:

providing power to switching elements of a switched mode pulse width modulated power supply; and controlling the switching elements of the pulse width modulated power supply to output a predetermined pulse sequence to the circuit, the predetermined pulse sequence including pulses having predetermined scaled pulse widths respectively determined to collectively provide a maximally flat voltage response in the circuit for a current transient of a predetermined power state transition of the circuit based on a predefined model of the circuit, the predefined model including at least analogous elements of inductance, capacitance, load, and power switching characteristics.

* * * * *

UNITED STATES PATENT AND TRADEMARK OFFICE
CERTIFICATE OF CORRECTION

PATENT NO. : 7,961,023 B2
APPLICATION NO. : 12/781724
DATED : June 14, 2011
INVENTOR(S) : Gizara It is certified that error appears in the above-identified patent and that said Letters Patent is hereby corrected as shown below:

Title Page 2, item (56), under "Other Publications", in Column 2, Line 5, delete "Sumposium" and insert -- Symposium --.

Title Page 2, item (56), under "Other Publications", in Column 2, Line 9, delete "Conferenc e" and insert -- Conference --.

Column 1, line 6, delete "APPLICATIONS" and insert -- APPLICATION --.

Column 11, line 28, in Claim 6, delete "comprises" and insert -- comprises: --.

Column 11, line 57, in Claim 10, delete "teen" and insert -- term --.

Column 15, line 9, in Claim 25, delete "and:" and insert -- and --.

Signed and Sealed this
Eighteenth Day of October, 2011

David J. Kappos
*Director of the United States Patent and Trademark Office*